April 26, 1955 — D. R. KING — 2,706,858
ROTARY SINE INDEXING FEATURE
Filed Aug. 18, 1952 — 2 Sheets-Sheet 1
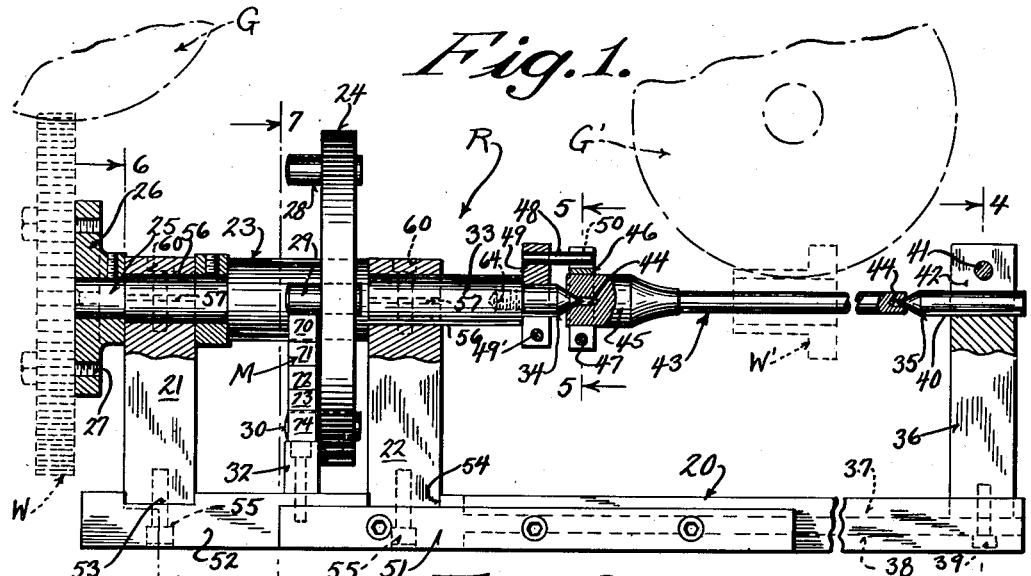
Fig. 1.
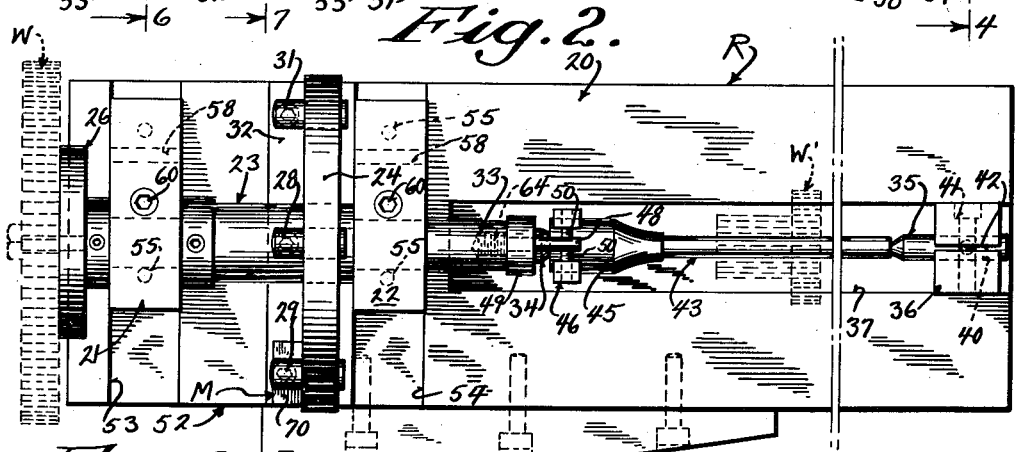
Fig. 2.
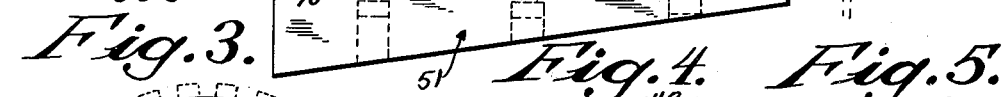
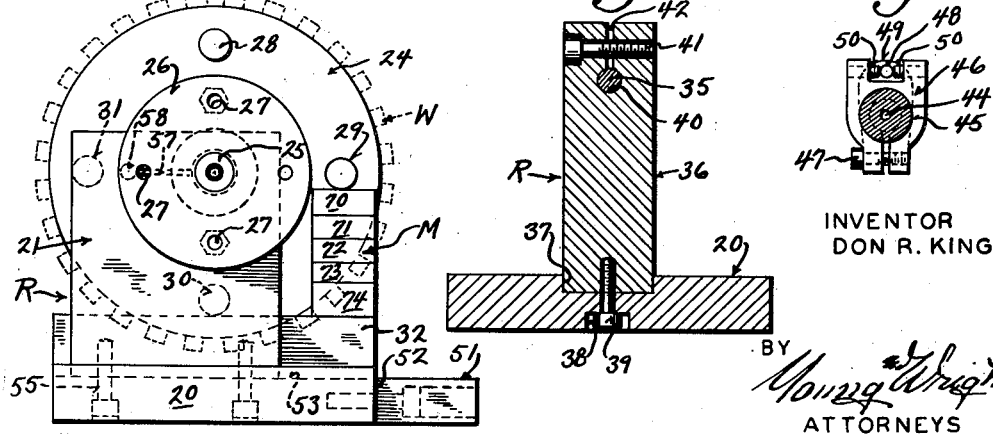
Fig. 3. Fig. 4. Fig. 5.
INVENTOR
DON R. KING
BY
ATTORNEYS April 26, 1955

D. R. KING 2,706,858

ROTARY SINE INDEXING FEATURE

Filed Aug. 18, 1952

INVENTOR
DON R. KING

BY
*Young Wright*
ATTORNEYS

United States Patent Office

2,706,858
Patented Apr. 26, 1955

2,706,858
ROTARY SINE INDEXING FEATURE

Don R. King, Granville, Wis., assignor to Milwaukee Precision Grinding Corp., Milwaukee, Wis., a corporation Application August 18, 1952, Serial No. 304,948

1 Claim. (Cl. 33—174)

My invention relates to a rotary sine device and more particularly to a device having a rotary sine plate mounted for rotation about a horizontal axis and means for determining precision angular adjustment and accurate divisions of any part of a circle for slotting, grooving and grinding any particular type of work.

Those skilled in the art of tool making appreciate the fact that the method of determining the angularity of a conventional sine plate structure by the use of measuring instrumentalities of the type known in the trade as gauge blocks produces exact results with the utmost precision. The present invention employs the same principal but as applied to a rotary sine plate embodying equally spaced projecting pins, the position of which, in relation to the base, by means of the gauge blocks, determines the angularity of the rotary sine and can establish any number of equal divisions through 360° of rotation of the plate, with the resultant accurate positioning and for spacing of the work.

A primary object of my invention, therefore, is to provide a novel structure utilizing the above principals in which the rotary sine plate is secured to an intermediate section of a horizontally positioned shaft with each end of the shaft carrying work holding means.

Conventional rotary indexing plates which have hitherto been resorted to to locate work in angular divisions are usually provided with peripheral slots or teeth to give the desired divisions. The more conventional forms available to the trade are index plates having ten teeth, giving divisions of 2, 5, and 10; twenty-four teeth, giving divisions of 2, 3, 4, 6, 8, 12 and 24; thirty-six teeth, to provide divisions of 2, 3, 4, 6, 9, 12, 18, and 36.

Having only the above plates available, it can be seen that, if a job required 5 divisions, the index plate having ten teeth would be used; if a job required 8 divisions, the index plate having twenty-four teeth would be used, and if the job required 9 divisions, the index plate having thirty-six teeth must be used.

Now, in order to obtain any other division, say 17 or 28 and any other degree of division, it is obviously necessary to have additional indexing plates in the shop. This past practice has proven both time consuming and costly to the machine shop doing precision work.

Recognizing these shortcomings, attempts have been made to overcome these past difficulties by providing additional indexing means to be used with the index plates, but because of the high degree of accuracy required, the results have been to produce such a complicated structure as to make the cost of the same so high as to be substantially unattainable to the bulk of the trade.

Therefore, another important object of my invention is to provide a novel rotary sine plate which eliminates the necessity of using various slotted index plates or other complicated high costing structures and which will perform any of the grinding, grooving or slotted work accomplished by prior structures with precision and in a much more expedient manner.

Still another object of my invention is to provide a novel sine rotary indexing means which is particularly adapted to surface grinders for grinding surfaces, slots, projections, grooves, splines, angles, forms, etc., with great precision and which will give accurate spacing and any number of divisions in a circle limited only to the flexibility, adaptability and accuracy of the gauge blocks available to the shop.

A further object of my invention is to provide one end of the shaft to which my novel rotary sine plate is fixed with a work holding plate particularly adapted to hold round work to be slotted or grooved (such as precision gears, splines, gauge pieces, etc.) and to provide the other end with a detachable work holder to hold other work for internal slotting, grooving, etc.

A more specific object of my invention is to provide a rotary sine plate indexing device including a base having two upright standards which carry the horizontally disposed shaft and the rotary sine plate, the rear end of the base carrying a sliding adjustable standard holding a center which cooperates with a corresponding center threadedly received in the respective end of the shaft and between which is supported a mandrel for holding work to be done between centers.

A further object of my invention is to provide a simple, practical, and reliable construction that is economical to manufacture, easy to assemble, and positive in its operation.

With the above and other objects in view, which will more readily appear as the nature of the invention is better understood, the same consists in the novel method, construction, combination and arrangement of parts hereinafter more fully described, illustrated, and claimed.

One preferred and practical embodiment of my invention is shown in the accompanying drawings, in which:

Figure 1 is a side elevational view of my novel rotary sine indexing device, certain parts being broken away to more fully illustrate details of construction; two different types of work being shown in dotted lines in their respective positions on the device during a grinding operation;

Figure 2 is a top plan view of the same;

Figure 3 is a front elevational view of my rotary sine indexing device showing in dotted lines a piece of work having 28 divisions secured to the work holder plate and clearly illustrating the proper position of the gauge blocks;

Figure 4 is a vertical sectional view taken on the line 4—4 of Figure 1 looking in the direction of the arrows and showing in particular the construction of the sliding standard which carries a center for supporting one end of a work holding mandrel;

Figure 5 is a transverse sectional view of my mandrel utilized to hold the work between centers and showing in particular the positive drive connection between the rotary sine plate and the work holding mandrel, the section being taken on the line 5—5 of Figure 1 and looking in the direction of the arrows;

Figure 6:
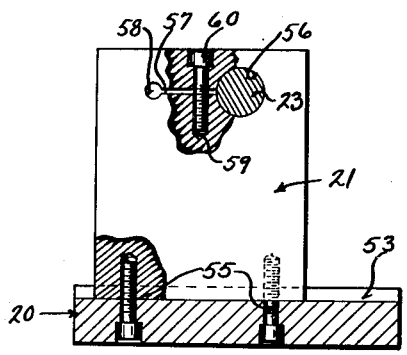
Figure 6 is a vertical sectional view taken through the front portion of my machine on the line 6—6 of Figure 1 looking in the direction of the arrows and with certain parts being broken away to better illustrate details of construction.
Figure 7:
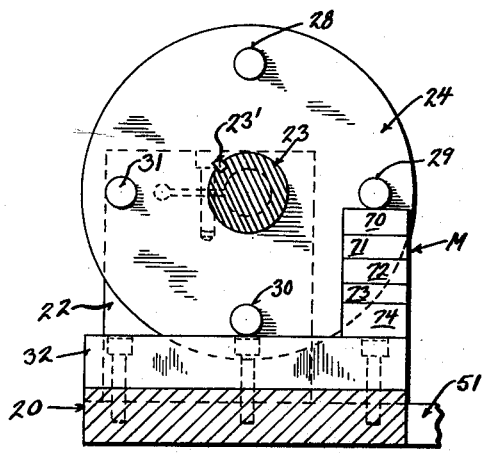
Figure 7 is a vertical sectional view taken on the line 7—7 of Figure 1 looking in the direction of the arrows and showing more particularly my novel rotary sine plate and the gauge blocks utilized therein.
Figure 8:
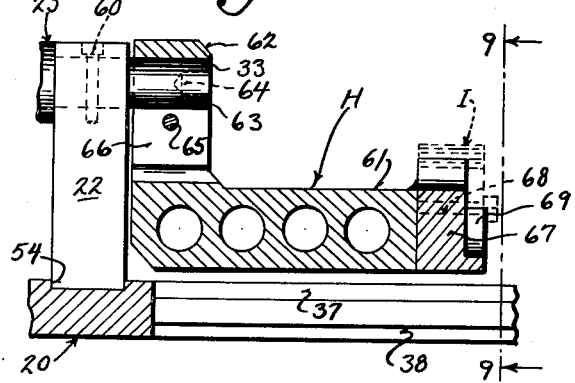
Figure 8 is a fragmentary side elevational view partly in section of the rear portion of my device and showing my detachable work holder which is used for precision internal slotting of the work.
Figure 9:
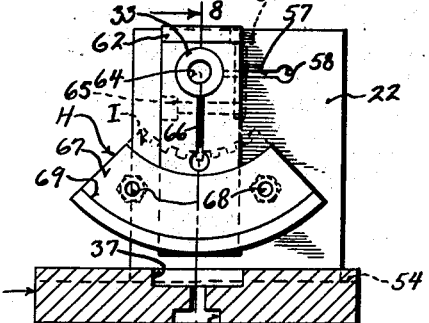
Figure 10:
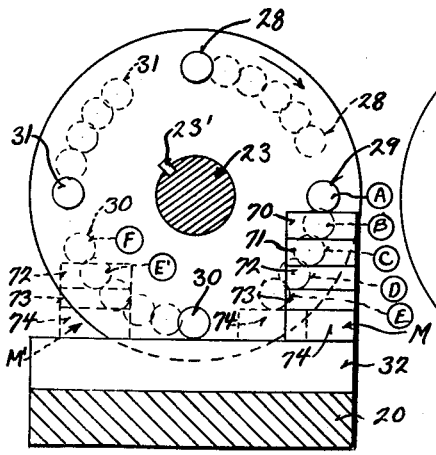
Figure 11:
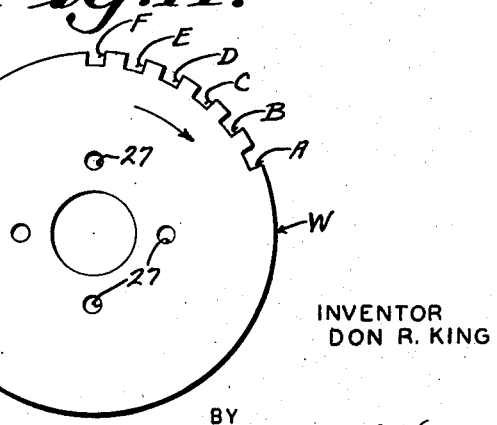

Figure 9 is a rear elevational view, partly in section of the form of work holder shown in Figure 8, the section being represented by the line 9—9 in Figure 8 and looking in the direction of the arrows; and Figures 10 and 11 represent schematic views of the rotary sine plate and work respectively, illustrating the various positions of the gauge blocks and projecting pins of the sine plate (Figure 10) when slotting (Figure 11) in 28 equal spacings or divisions.

Referring now to the drawings in detail, wherein similar reference characters designate corresponding parts throughout the several views, the letter R generally indicates one type of my improved rotary sine plate indexing device and the same includes broadly a base 20, a pair of spaced upright support members 21 and 22 which rotatably carry the horizontally positioned shaft 23. Secured to the shaft 23, at a point intermediate its ends and between the supports 21 and 22, is my rotary sine plate 24. This plate may be secured to the shaft in any manner, such as being splined thereto, sweated or bolted on. However, for convenience, I have shown the plate 24 keyed to the shaft 23 by means of the key 23'. The forward end 25 of the shaft 23 has fixed thereto, in any desired manner, a work holding plate 26 provided with suitable tapped holes 27 which are utilized to secure the work W to the plate.

The principal and successful operation of my device lies in the fact that the rotary sine plate 24 is accurately positioned on the shaft 23 and exactly centered and is provided with four equally spaced pins 28, 29, 30 and 31 respectively which project from the forward face thereof. The exact distance between the centers of any two pins being exactly the same as the distance between the center of the other two pins, these pins lie in the respective corners of a perfect square. The distance from the center of the rotary sine plate to the center of each pin is the same and the known distance must be very accurately determined so that the exact distance from the lower under surface of any one pin and a base bar 32 will be known and be precise and exact (when the center of the pin, center of the sine plate and the center of the pin opposite lie in the same horizontal plane). Therefore, the top surface of the base bar 32 must be highly machined within very small limits and tolerances.

The other end 33 of the shaft 23 is provided with a central threaded portion 64 to which may be attached a center 34 and in one form of the invention I mount the opposite center 35 on a slidable upright vertical standard 36. The upright standard 36 is received in a longitudinal groove 37 formed in the rear portion of the base 20 and opening out on the bottom of the base from the groove 37 is a T slot 38 (see Figures 8 and 9). The bottom of the upright standard 36 is threaded to receive, in particular, a bolt 39 (Figure 4) the head of which is received in the T slot 38 and by loosening or tightening the bolt 39, the standard may be either slid longitudinal of the base 20 or locked thereto as desired.

While any known and conventional center may be utilized in connection with the base, I prefer to use an elongated round bar center 35 which is snugly received in a bore 40 in the standard 36. The center 35 is locked in the bore 40 by means of the bolt 41 extending through the slotted portion 42 which opens out from the bore to the top of the standard. The work W' (dotted lines) which is to be done between the centers, is usually supported on a mandrel 43 as shown and the same includes means 44 at either end for receiving the centers 34 and 35 respectively. The forward thickened portion 45 of the mandrel 43 is provided with a yoke 46 which is tightened to the mandrel by means of the nut 47 and the center 34 is provided with a projecting pin 48 which is, in turn, fixed to a holder 49. The holder 49 is adjustably secured to the center 34 by utilizing a threaded bolt 49' which may be tightened in a manner similar to bolt 47 for the yoke 46. The pin 48 projects into the yoke 46 and is held against any movement by adjusting the set screws 50 as shown more particularly in Figure 5 of the drawings.

In utilizing my device the same may be bolted or clamped in any manner to the bed of a surface grinder at any desired angle and if the slot or slots in the work are not to run through longitudinally or transversely of the work but are at some angle thereto, I utilize an angle bar 51 which may be bolted to the side 52 of the base 20 to locate my device for the correct angular approach of the grinding wheel G. The upright standards 21 and 22 which support the rotatable shaft 23 are also set in transverse grooves 53 and 54 respectively formed in the base 20 and bolts 55 are used to firmly bolt the standards in position. Each of the upright standards is provided with a precision bore 56 which forms the bearing surface for shaft 23 and extending radially from each bore 56 is a slot 57 which opens out into a smaller bore 58. Extending from the top surface of each standard (Figure 8) adjacent one end of the bearing or bar 56, through the slot 57, is a threaded bore 59 which receives a correspondingly threaded bolt 60. It is obvious that by tightening the bolt 60, the shaft may be held against rotation and that either piece of work W or W' will be held steady while being slotted by the grinding wheels G and G' respectively. Of course only one piece of work will be slotted, grooved or ground at any one time.

Referring now to Figures 8 and 9 of the drawings, I illustrate a work holding attachment H which may be utilized for internal slotting of the work I and the same includes a base portion 61, one end of which is provided with a right angularly extending leg 62. The leg 62 has a central bore 63 therethrough which receives the end 33 of the shaft 23. This work holder H is also adjustably and detachably secured to the end 33 by providing a transverse bolt 65 which extends through the slot 66. The rear opposite end of the base 61 is provided with a curved work holding plate 67 having suitable tapped holes 68 for securing the internal work I thereto, as shown in dotted lines. The lower portion of the work I, in some instances, may be supported by the arcuate lip 69, formed on the extreme rear end of the work holder plate 67. When using the attachment H, I usually remove the center 34 from its threaded bore 64 so that the center will not be accidentally damaged.

It should be obvious from the above, that by utilizing the number of gauge blocks M required for any desired divisions needed in the slotted work and placing them under the pins 28, 29, 30, and 31, that each rotation or movement of the sine plate 24 will correspondingly move the work W on the plate 26, or the work W' on the mandrel 43, or the work I on the work holder H, as the case may be.

In order to better understand the exact relation of the gauge blocks M to the pins 28, 29, 30 and 31, and the rotary sine plate 24, I have illustrated in Figures 10 and 11 how, by the use of a pile of five gauge blocks, I may obtain 28 equally spaced divisions or slots in the work W. This is accomplished in the following method.

Assuming that the work W is secured to the plate 26, as disclosed in Figures 1, 2, and 3 inclusive, and that it is desired to groove or slot the peripheral edge of the work in 28 equally spaced divisions of certain degrees; the work is first laid out and it is found that to obtain the 28 divisions I can utilize a pile of gauge blocks M comprising only five gauge blocks 70, 71, 72, 73, and 74. This is due to the fact that I utilize the angle and the co-angle of the sine and shift the blocks from right to left on the base bar 32, thereby using two of the pins for obtaining eight slots as the third pin comes into play. It is to be noted, of course, that the five gauge blocks used are different widths in order to obtain the equal spacing and this is due to the fact that while the arcuate distance that the center of each pin moves for each slot is exactly the same, the vertical distance from the center of the pin to the surface of the bar 32 must necessarily vary. In order to form the groove or slot A, the rotary sine plate 24 is in the position illustrated in Figure 10, with the pins 28, 29, 30, and 31 in their full lined position and the pile M of gauge blocks resting under the pin 29 as shown. The slot A is then cut by the grinding wheel G and, of course, the slot A is, at the time it is being cut, in the same position shown in the drawing and indicated as groove F. After slot A is cut, gauge block 70 is removed and pin 29 moved down to the next position shown in dotted lines, where it rests on the top surface of gauge block 71 and the slot B is produced. Slot C is cut after gauge block 71 is removed and pin 29 moved down to where it rests on the surface of gauge block 72. Each movement of the pin 29 causes a corresponding movement of the work holder 26 and an equal movement of the work W. The gauge blocks are progressively removed until groove E has been cut. In this position the pin 29 will be resting directly on the upper surface of the lower gauge block 74. For purposes of illustration, I have shown the corresponding letter for each slot next to the proper position of the pin 29 when that particular slot is being cut. In the meantime, pin 30, which had been resting directly on the bar 32 when slot A was cut, has been correspondingly moved and is in the dotted line position indicated by the letter E' while the groove E was being cut. In order to form slot F, I utilized the pin 30 and the same must be moved up one division by utilizing gauge blocks 72, 73, and 74 and the pin 30 will be resting directly on the top surface of gauge block 72 as shown in its extreme dotted line position.

Two additional slots are formed by adding to the pile M', gauge blocks 71 and 70 respectively and pin 30 will finally occupy the full line position indicated as pin 31. The pile of the five gauge blocks is then moved back to the right hand side of the base bar 32 to their original position where pin 28 will be in the full line position that was occupied by pin 29 during the cutting of slot A. Gauge bar 70 is then removed, pin 28 moved down until it rests on the surface of gauge block 71 and the whole procedure is repeated. Thus it can be seen that by utilizing the angle and co-angle, and shifting the gauge blocks back and forth on the base bar 32, that I may provide in the work W, 28 equal divisions of slots by utilizing only five gauge blocks. This is a decided advantage over any of the prior art and, as previously stated, the spacing of any division of the work W is limited only to the versatility of the gauge blocks. I am thus able to obtain precision work which hithertofore was a costly and timely operation, in a fairly quick and expedient manner, without sacrificing any of the precision needed to accomplish the job.

From the foregoing, it is believed that the features and advantages of the invention will be readily apparent to those skilled in the art, and it will, of course, be understood that changes in the form, proportion and minor details of construction may be resorted to without departing from the spirit of the invention or the scope of the appended claim.

I claim:

A rotary sine index device comprising an elongated base having a pair of spaced upright standards secured thereto, one standard being positioned adjacent one end of the base and the other standard being positioned adjacent the other end of the base, a third standard secured to said base intermediate said first pair of standards, said intermediate standard being in closer proximity to one end standard, a horizontally disposed shaft rotatably supported by the said one end standard and said intermediate standard, means for locking said shaft against rotation, means on each end of the shaft for affixing work thereto, said means including a work holding plate secured to said shaft adjacent the respective one end standard and a center secured to the other end of said shaft adjacent said intermediate standard cooperating with an opposing center secured to said other end standard, a sine plate secured to said shaft intermediate its ends for rotation therewith, a transverse base bar secured to said base adjacent said sine plate, said base bar having a highly polished upper surface and said bar being machined to precision limits and tolerances, and four equally spaced cylindrical pins secured to said sine plate and projecting over said base bar, the central longitudinal axis of each pin respectively being located at a respective corner of a perfect square, each pin having its central longitudinal axis parallel to the central longitudinal axis of the shaft, the distance between the central axis of any one pin and the central axis of said shaft being known and fixed and the distance from the top surface of the base bar and the lower surface of any one pin being known and fixed, whereby block type measuring instrumentalities may be supported on said base bar in flat contacting relationship to its polished surface to accurately measure the distance from the pin to said surface to determine the angular position of said sine plate and pin and work fixed to said work holding plate and held between said centers for any number of equal divisions over a total angularity of 360 degrees.

References Cited in the file of this patent

UNITED STATES PATENTS

| | | |
|---|---|---|
| 704,440 | Croker | July 8, 1902 |
| 1,169,900 | Winter | Feb. 1, 1916 |
| 1,729,812 | Andrews, Jr. | Oct. 1, 1929 |
| 2,309,142 | Stafford | Jan. 26, 1943 |
| 2,324,476 | Becker | July 20, 1943 |
| 2,351,246 | Walling | June 13, 1944 |
| 2,406,043 | Sorensen | Aug. 20, 1946 |
| 2,676,493 | Mander | Apr. 27, 1954 |